(12) United States Patent
Sasaki et al.

(10) Patent No.: US 7,654,779 B2
(45) Date of Patent: Feb. 2, 2010

(54) POWER TOOL

(75) Inventors: Katsuhiko Sasaki, Anjo (JP); Tomoyuki Kondo, Anjo (JP)

(73) Assignee: Makita Corporation, Anjo (JP)

( * ) Notice: Subject to any disclaimer, the term of this patent is extended or adjusted under 35 U.S.C. 154(b) by 105 days.

(21) Appl. No.: 11/334,402

(22) Filed: Jan. 19, 2006

(65) Prior Publication Data

US 2006/0163824 A1 Jul. 27, 2006

(30) Foreign Application Priority Data

Jan. 24, 2005 (JP) ............................. 2005-016130

(51) Int. Cl.
*B23B 31/107* (2006.01)

(52) U.S. Cl. .......................... 408/240; 279/75; 279/905

(58) Field of Classification Search ............. 408/239 R, 408/240, 239 A; 279/55, 57, 66, 74, 75, 279/76, 78, 79, 80, 82, 904, 905, 17, 22, 279/148

See application file for complete search history.

(56) References Cited

U.S. PATENT DOCUMENTS

| | | | | | |
|---|---|---|---|---|---|
| 1,119,276 | A | * | 12/1914 | Griffith et al | 279/75 |
| 1,740,645 | A | * | 12/1929 | Currier | 279/75 |
| 3,436,086 | A | * | 4/1969 | Glenzer | 279/30 |
| 3,735,993 | A | * | 5/1973 | Seibert | 279/75 |
| 3,945,653 | A | * | 3/1976 | Falchle | 279/97 |
| 4,290,617 | A | * | 9/1981 | Yoshida | 279/75 |
| 4,309,042 | A | * | 1/1982 | Fauth et al. | 279/75 |
| 4,577,875 | A | * | 3/1986 | Miyakawa | 279/75 |
| 4,692,073 | A | | 9/1987 | Martindell | |
| 4,900,202 | A | * | 2/1990 | Wienhold | 408/240 |
| 5,013,194 | A | * | 5/1991 | Wienhold | 408/240 |
| 5,062,749 | A | * | 11/1991 | Sheets | 279/75 |
| 5,398,946 | A | * | 3/1995 | Quiring | 279/30 |
| 5,417,527 | A | * | 5/1995 | Wienhold | 408/239 R |
| 5,573,255 | A | * | 11/1996 | Salpaka | 279/75 |
| 5,954,347 | A | * | 9/1999 | Buck et al. | 279/20 |
| 6,270,085 | B1 | * | 8/2001 | Chen et al. | 279/22 |
| 6,325,393 | B1 | * | 12/2001 | Chen et al. | 279/22 |
| 6,457,916 | B2 | * | 10/2002 | Wienhold | 408/240 |
| 6,561,523 | B1 | * | 5/2003 | Wienhold | 279/30 |
| 6,695,321 | B2 | * | 2/2004 | Bedi et al. | 279/22 |
| 6,874,387 | B2 | * | 4/2005 | Vaughn | 74/594.1 |
| 6,902,358 | B2 | * | 6/2005 | Thomas | 408/226 |
| 6,920,810 | B1 | * | 7/2005 | Thompson et al. | 81/177.85 |
| 7,121,774 | B2 | * | 10/2006 | Hirt et al. | 408/240 |
| 2001/0043841 | A1 | * | 11/2001 | Wienhold | 408/240 |
| 2004/0026878 | A1 | | 2/2004 | Chen et al. | |
| 2004/0081523 | A1 | * | 4/2004 | Vasudeva et al. | 408/240 |

FOREIGN PATENT DOCUMENTS

JP  A 2000-218412  8/2000

* cited by examiner

*Primary Examiner*—Daniel W Howell
(74) *Attorney, Agent, or Firm*—Oliff & Berridge, PLC (57) ABSTRACT

A power tool includes a tool bit, a tool holder, a bit holding member, a bit mounting hole, a through hole, an outside opening, a bit mounting hole side opening, an engaging member, a cylindrical operating member, a movement preventing portion, a biasing member, a first engaging region, a second engaging region, and a third engaging region. As the first, the second and the third engaging regions respectively cooperate, the tool bit can be automatically secured to the bit holding member by inserting the tool bit into the bit mounting hole of the bit holding member. Mounting and removing of the tool bit can be achieved without a ring spring.

9 Claims, 9 Drawing Sheets

POWER TOOL

BACKGROUND OF THE INVENTION

1. Field of the Invention

The present invention relates to a power tool that performs a screw-tightening operation or a drilling operation and more particularly, to a technique to mount a tool bit to the power tool with a simple construction.

2. Description of the Related Art

Japanese non-examined laid-open Patent Publication No. 2000-218412 discloses a driver bit mounting device for an impact driver. According to the known device, the tool bit is mounted simply by inserting the driver bit into the bit mounting hole of the tool holder. In the known device, an, elongate hole radially extends through the tool holder having a bit mounting bole and has a predetermined length in the axial direction. A steel ball is disposed in the elongate hole and can move in the both axial and radial directions of the tool holder. The steel ball is biased by a ring spring such that part of the steel ball protrudes into the bit mounting hole. When the driver bit inserted into the bit mounting hole, the steel ball is pushed by the lip end portion of the driver bit and once moves in the axial direction while expanding the ring spring in diameter. Thereafter, the steel ball further moves outward in the radial direction, so that the driver bit is allowed to be inserted When the driver bit is inserted until the groove (notch) of the driver bit faces the steel ball, the steel ball moves inward in the radial direction by the restoring force of the ring spring and then moves in the axial direction into engagement with the groove. As a result, the driver bit is prevented from moving into the direction of removal and locked in the inserted position.

In the known art, after insertion of the driver bit, the steel ball which is in engagement with the groove of the driver bit is prevented from moving outward in the radial direction by a movement preventing portion of a cylindrical opting sleeve fitted on the tool holder. Thus, the steel ball is held engaged with the groove of the driver bit With such construction, the ring spring is necessarily indispensable for moving the steel ball in the axial direction into a position in which the steel ball faces the movement preventing portion of the operating sleeve. Thus, the number of parts is increased and the structure is complicated.

SUMMARY OF THE INVENTION

Accordingly, it is an object of the invention to provide an effective technique for simplifying the structure while maintaining the ease of operation for mounting and removing a tool bit in a tool holder of a power tool.

The above-described object is achieved by power tools as claimed. The representative power tool may include a tool bit, a tool holder, a bit holding member, bit mounting hole, a through hole, an outside opening, a bit mounting hole side opening, an engaging member, a cylindrical operating member, a movement preventing portion, a biasing member, a first engaging region, a second engaging region, and a third engaging region. The tool bit performs a predetermined operation on a work-piece. The tool holder holds the tool bit. The bit holding member is formed cylindrically and is provided with the tool holder. The bit mounting hole is provided with the bit holding member. The through hole is formed in the bit holding member. The outside opening is defined by one end of the through hole open to an outside surface of the bit holding member, while the bit mounting hole side opening is defined by the other end of the through hole open to the bit mounting hole. The engaging member is disposed within the through hole to move between an outside position and an inside position The cylindrical operating member is coupled on the bit holding member to move in the axial direction of the tool bit holding member. The movement preventing portion is disposed within the operating member to move between a movement preventing position and a movement allowing position in relation to the movement of the operating member. The movement preventing portion prevents movement of the engaging member from the inside position to the outside position by engaging with the engaging member when located in the movement preventing position. On the other hand, the movement preventing portion allows movement of the engaging member between the inside position and the outside position by disengaging from the engaging member when located in the movement allowing position.

The biasing member applies a biasing force to the operating member to hold the movement preventing portion normally in the movement preventing position The first engaging region is defined between the tool bit and the engaging member. The first engaging region is formed in the direction of insertion of the tool bit into the bit mounting hole. The second engaging region is defined between the tool bit and the engaging member so as to be provided in the direction of removal of the tool bit from the bit mounting hole. The third engaging region is defined between the engaging member and the operating member. The third engaging region is formed contiguous to the movement preventing portion when the tool bit is inserted into the bit mounting hole.

When the tool bit is inserted into the bit mounting hole, the engaging member moves from the inside position to the outside position via the first engaging region and in relation to the movement to the outside position, the engaging member moves the movement preventing portion of the operating member from the movement preventing position to the movement allowing positron via the third engaging region against the biasing force of the biasing member so as to define a cam actuating member to allow the further insertion of the tool bit.

When the tool bit is inserted into a predetermined position within the bit mounting hole, the movement preventing portion of the operating member moves from the movement allowing position to the movement preventing position by the biasing force of the biasing spring to cause the engaging member to move from the outside position to the inside position via the third engaging portion. The engaging member engages with the tool bit via the second engaging region in the inside position so as to define a stopper to prevent removal of the tool bit by further engaging with the movement preventing portion located in the movement preventing position.

With such construction, according to the invention, the tool bit can be automatically secured to the bit holding member simply by inserting the tool bit into the bit mounting hole of the bit holding member and as a result, mounting and removal of the tool bit can be achieved without provision of a ring spring which was needed in the prior art tool holder. Thus, according to the invention, an effective technique is provided for simplifying the structure while maintaining the ease of operation for mounting and removing a tool bit in a tool holder of a power tool. Other objects, features and advantages of the present invention will be readily understood after reading the following detailed description together with the accompanying drawings and the claims.

BRIEF DESCRIPTION OF THE DRAWINGS

FIG. 13 illustrates locking of the operating sleeve which may occur when the tool holder is held in an upright position, with FIG. 13(A) showing the state in which the opening sleeve is placed in the movement allowing position and FIG. 13(B) showing the state in which the operating sleeve has locked.

FIG. 19 illustrates that the operating sleeve is avoided from locking when the tool holder is held in an upright position, with FIG. 19(A) showing the state in which the operating sleeve is placed in the movement allowing position and FIG. 19(B) showing the state in which the operating sleeve is returned to the movement preventing position without locking.

DETAILED DESCRIPTION OF THE INVENTION

Each of the additional features and method steps disclosed above and below may be utilized separately or in conjunction with other features and method steps to provided and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawing.

First Representative Embodiment

Figure 1:
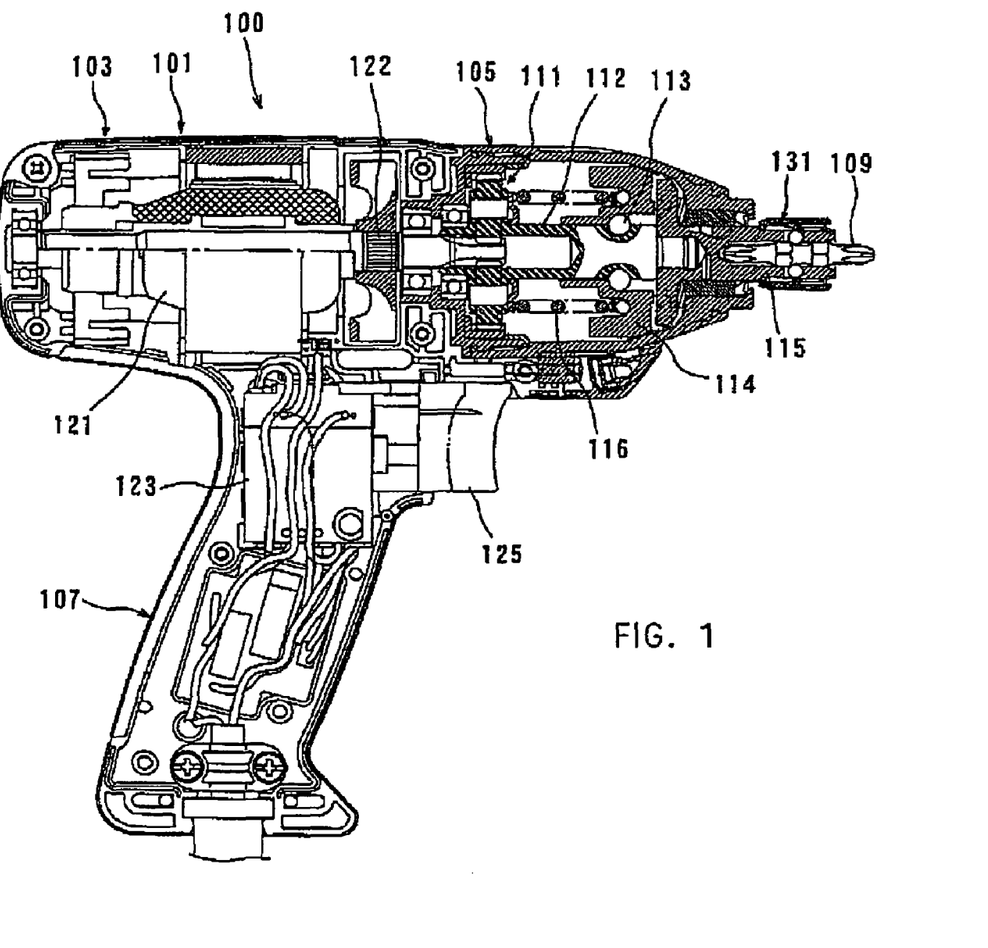
FIG. 1 is a sectional view showing an entire impact driver according to a first embodiment of the invention.
Figure 2:
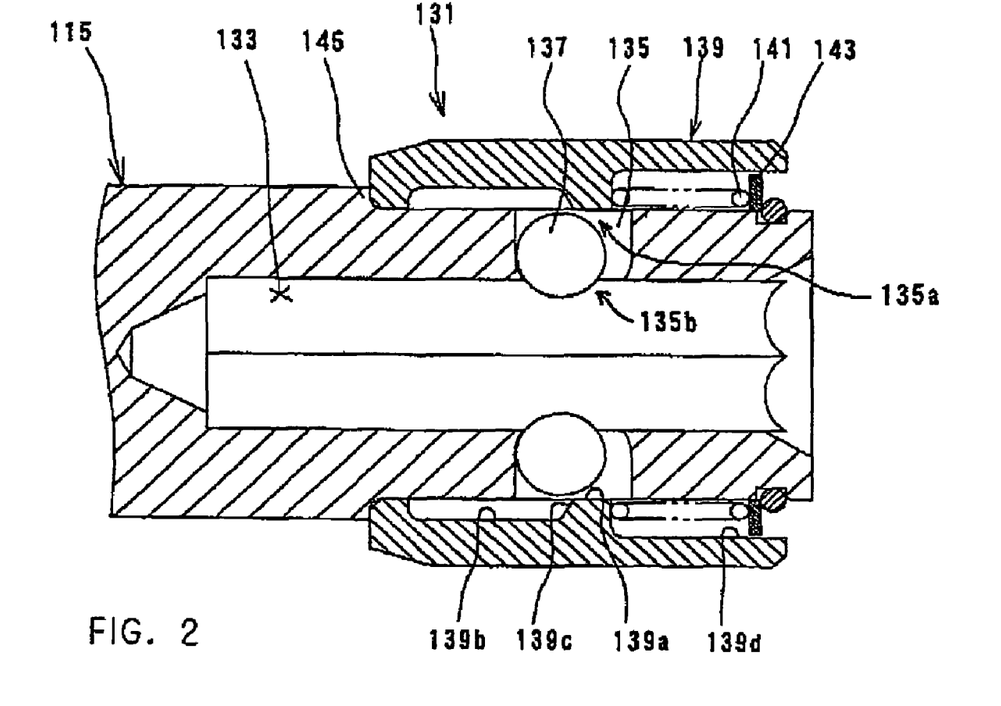
FIG. 2 is a sectional view showing an entire tool holder.
Figure 5:
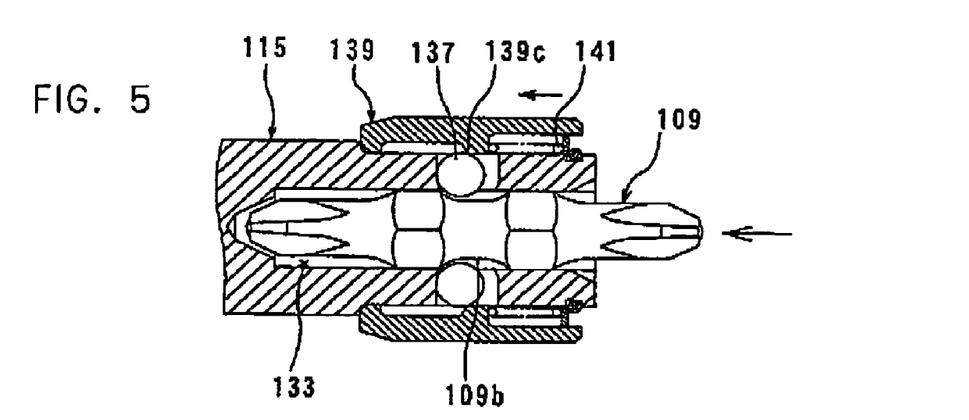
FIG. 5 illustrates how the driver bit is mounted in the tool holder, showing the bit insertion completed state in which the steel balls are engaged with a lock groove of the driver bit.
Figure 6:
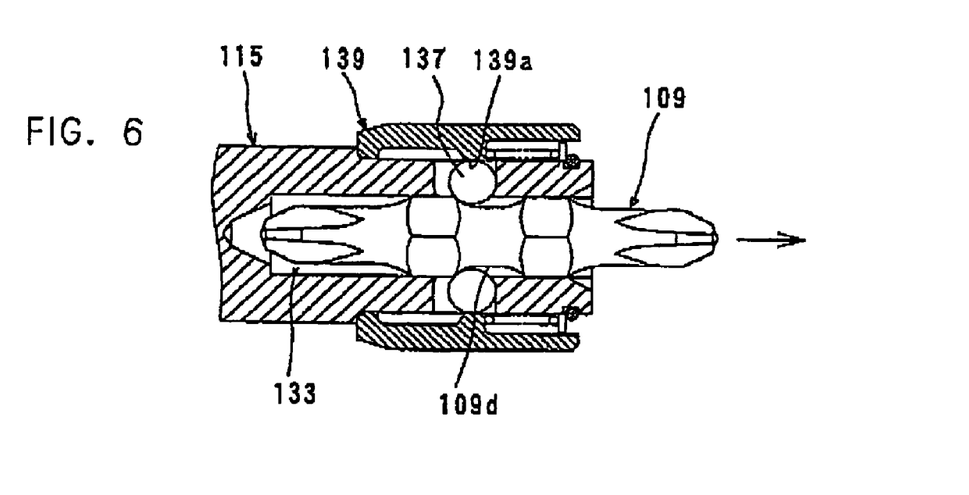
FIG. 6 shows the state in which the driver bit is locked and prevented from being removed.
Figure 7:
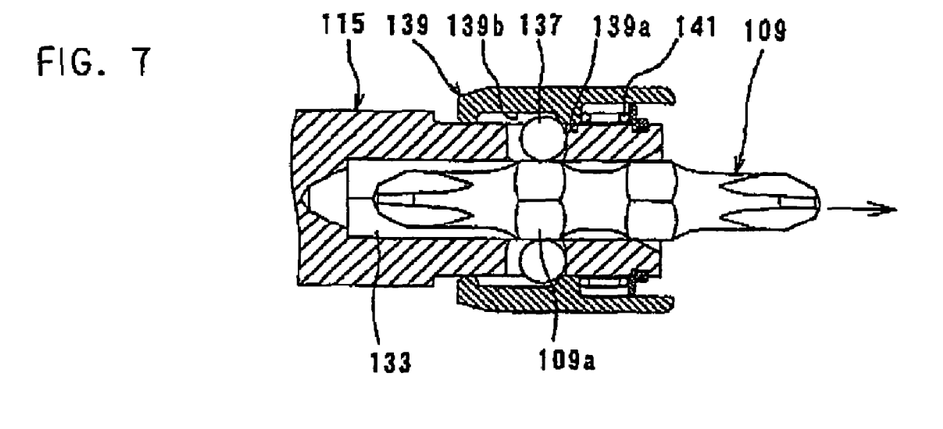
FIG. 7 shows the state in which the driver bit is released from the lock and allowed to be removed.

A representative first embodiment of the present invention will now be described with reference to FIGS. 1 to 7. FIG. 1 shows an entire electric impact driver 100 as a representative embodiment of a power tool according to the invention. FIG. 2 shows an entire tool holder 131. FIGS. 3 to 6 illustrate how a driver bit 109 is mounted in the tool holder 131. FIG. 7 shows the state in which the driver bit 109 is allowed to be removed from the tool holder 131. As shown in FIG. 1, the impact driver 100 of this embodiment includes a body 101 and the driver bit 109. The driver bit 109 is detachably mounted in the tip end region of the body 101 via the tool holder 131 and performs an operation of tightening various screws. The driver bit 109 is a feature that corresponds to the "tool bit" according to the present invention.

The body 101 includes a motor housing 103, a gear housing 105 and a handgrip 107. The motor housing 103 houses a driving motor 121. A trigger 125 for throwing a power switch 123 of the motor 121 is provided on the handgrip 107. The gear housing 105 houses a speed reducing mechanism 111, a spindle 112 that is rotated by the speed reducing mechanism 111, a hammer 114 that is rotated by the spindle 112 via balls 113, and an anvil 115 that is rotated by the hammer 114. The speed reducing mechanism 111 comprises a planetary gearing for appropriately reducing the speed of rotation of a motor shaft 122 of the motor 121. The hammer 114 can move with respect to the spindle 112 in the axial direction and is biased toward the anvil 115 by a compression coil spring 116. The end of the anvil 115 protrudes from the end of the gear housing 105. The driver bit 109 is detachably mounted into this protruded end of the anvil 115.

When the driving motor 121 is driven to start a screw-tightening operation, the spindle 112 and the hammer 114 rotate together under light load conditions in which the tightening torque of the driver bit 109 is low. Under this light load conditions, the hammer 114 is held engaged with the anvil 115 by the biasing force of the compression coil spring 116. Therefore, the anvil 115 also rotates together with the hammer 114, so that the driver bit 109 performs a screw-tightening operation. When the tightening torque increases to a predetermined high load, the hammer 114 retracts away from the anvil 115 against the biasing force of the compression coil spring 116. Thereafter, the hammer 114 engages with the anvil 115 while producing impulsive rotating torque by the biasing force of the compression coil spring 116. Thus, high tightening torque is produced on the driver bit 109 via the anvil 115. The operating principle of the impact driver 100 is known in the art and therefore, will not be described in detail.

The tool holder 131 for detachably mounting the driver bit 109 to the impact driver 100 will now be explained with reference to FIG. 2. The tool holder 131 includes the anvil 115, steel balls 137 and an operating sleeve 139. The anvil 115, the steel balls 137 and the operating sleeve 139 are features that correspond to the "bit holding member", the "engaging member" and the "operating member" of the invention, respectively. The anvil 115 is disposed coaxially with the spindle 112 (see FIG. 1). A hexagonal bit mounting hole 133 is formed in the anvil 115 on the tip end side (on the right side as viewed in the drawing) and extends to a predetermined length in the axial direction. The axis of the bit mounting hole 133 coincides with the axis of the anvil 115.

A plurality of trough holes 135 are formed in the tip end portion of the anvil 115 and extend radially through the anvil 115. One end (on the outside) of each of the trough holes 135 opens to the outside surface of the tip end portion of the anvil 115, and the other end (on the inside) opens to the bit mounting hole 133. The steel balls 137 are disposed in the through holes 135 and can move in the radial direction such that the steel balls 137 can protrude into the bit mounting hole 133. More particularly, each of the steel balls 137 can move between an outside position (shown in FIG. 7) in which part of the steel ball 137 protrudes from the outside opening 135a of the assigned through hole 135 on the outside surface of the anvil 115 and an inside position (shown in FIG. 2) in which part of the steel ball 137 protrudes from the bit mounting hole side opening 135b of the through hole 135 into the bit mounting hole 133. The width of the inside opening of the through hole 135 in the circumferential direction of the anvil 115 is smaller than the diameter of the steel ball 137, while the width of the outside opening of the through hole 135 in the circumferential direction of the anvil 115 is larger an the diameter of the steel ball 137. Therefore, the steel ball 137 is inserted into the though hole 135 through the outside opening 135a and held in a position in which part of the steel ball 137 protrudes into the bit mounting hole 133 through the bit mounting hole side opening 135b. Thus, the steel ball 137 does not fall down into the bit mounting hole 133. Further, the length of the through hole 135 in the axial direction of the anvil 115 is larger than the diameter of the steel ball 137, which allows the steel ball 137 to move in the axial direction as well as in the radial direction of the anvil 115.

The operating sleeve 139 of a cylindrical shape is fitted over the tip end portion of the anvil 115 and can move in the axial direction. The operating sleeve 139 includes a movement preventing portion 139a and an annular movement allowing space 139b. The movement preventing portion 139a prevents the steel balls 137 from moving from the inside position to the outside position when the inside surface of the movement preventing portion 139a engages with the steel balk 137. The movement allowing space 139b is contiguously formed behind the movement preventing portion 139a when viewed from the bit inserting direction and allows the steel bails 137 to move to the outside position. The movement preventing portion 139a is a feature that corresponds to the "movement preventing portion" in the present invention. The operating sleeve 139 can move between a movement preventing position (shown in FIG. 2) in which the movement preventing portion 139a engages with the steel balls 137 and a movement allowing position (shown in FIG. 7) in which the movement allowing space 139b can receive the steel balls 137. The operating sleeve 139 is normally biased by a biasing spring 141 so as to be held in the movement preventing position. The biasing spring 141 is a feature that corresponds to the "biasing member" in the present invention.

The biasing spring 141 is disposed within an annular space 139d formed in the inner wall surface of the forward portion of the operating sleeve 139. The biasing spring 141 is elastically disposed between an axial end surface of the movement preventing portion 139a and a spring receiving ring 143 mounted onto the anvil 115. Thus, the biasing spring 141 biases the opening sleeve 139 in the rearward direction. Further, a stopper (stepped portion) 145 is formed around the anvil 115 and stops the operating sleeve 139 from further moving rearward Therefore, as shown in FIG. 2, in the state in which the driver bit 109 is not mounted within the anvil 115, each of the steel balls 137 is held in the inside position or in the protruded position into the bit mounting hole 133. Further, when the steel ball 137 is in contact with the rear wall surface of the through hole 135, the center of the steel ball 137 is located rearward of a boundary portion 139c between the movement preventing portion 139a and the movement allowing spare 139b of the operating sleeve 139.

Figure 3:
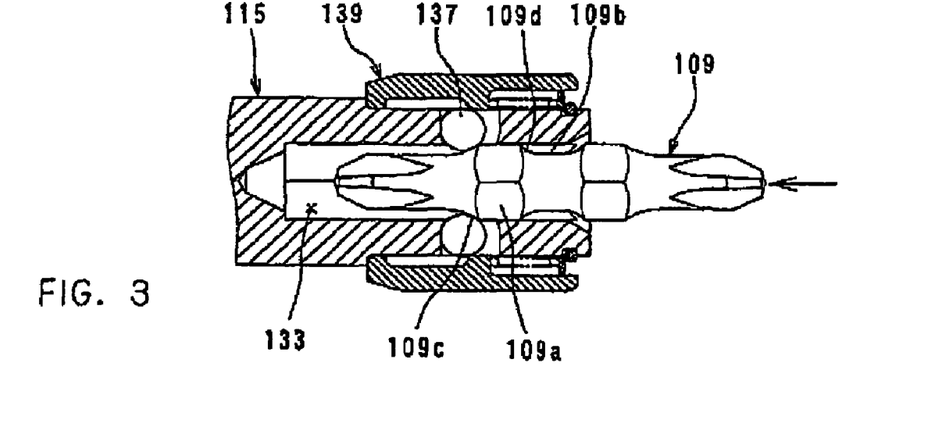
FIG. 3 illustrates how a driver bit is mounted in the tool holder, showing the initial stage of bit insertion.

As shown in FIG. 3, a shank 109a of the driver bit 109 has a hexagonal shape corresponding to the hexagonal shape of the bit mounting hole 133. An annular lock groove 109b is formed around the middle portion of the shank 109a in the axial direction.

Figure 4:
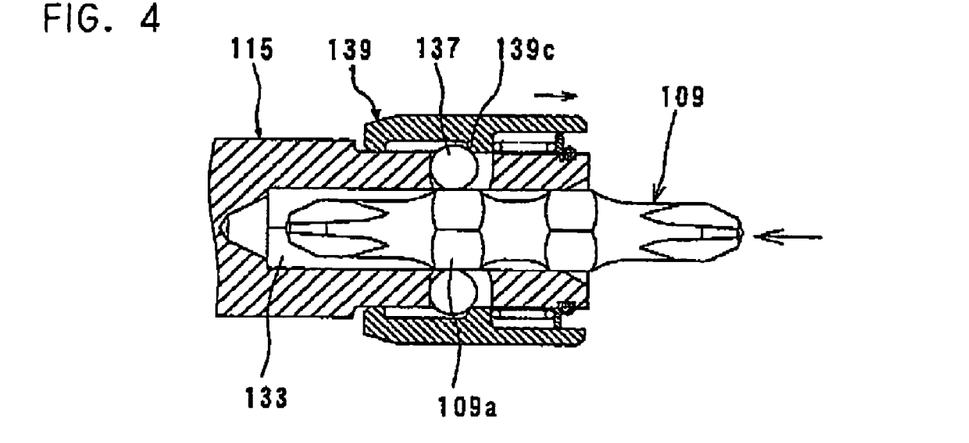
FIG. 4 illustrates how the driver bit is mounted in the tool holder, showing movement of steel balls and an operating sleeve.

Mounting and removal of the driver bit 109 will now be explained with reference to FIGS. 3 to 7. In order to mount the driver bit 109 within the tool holder 131, the driver bit 109 is inserted into the bit mounting hole 133 of the anvil 115. As shown in FIG. 3, when the driver bit 109 is inserted into the bit mounting hole 133 of the anvil 115, a tip end side periphery 109c contiguous to the shank 109a of the driver bit 109 engages with the steel balls 137. At the same time, the steel balls 137 are pressed against the rear wall surface of the through hole 135. At this time, the center of each of the steel balls 137 is located rearward of the boundary portion 139c between the movement preventing portion 139a and the movement allowing space 139b of the operating sleeve 139. When the driver bit 109 is pushed in this state, as shown in FIG. 4, the tip end side periphery 109c pushes the steel balls 137 from the inside position to the outside position in the radial direction. At the same time, the steel balls 137 press the boundary portion 139c between the movement preventing portion 139a and the movement allowing space 139b of the operating sleeve 139. This pressing force acts upon the operating sleeve 139 as components of force for moving the operating sleeve 139 forward in the axial direction. As a result, the operating sleeve 139 is caused to move against the biasing force of the biasing spring 141 to the movement allowing position in which the movement preventing portion 139a is disengaged from the steel balls 137.

Specifically, the steel balls 137 move the operating sleeve 139 from the movement preventing position to the movement allowing position while moving radially outward when pressed by the tip end side periphery 109c of the driver bit 109. Thus, each of the steel balls 137 serves as a cam member for allowing further insertion of the driver bit 109. The spherical surface of the steel ball 137 and the tip end side periphery 109c of the driver bit 109 form an inserting cam actuating region for moving the steel ball 137 outward by engaging and interacting with each other at the time of insertion of the driver bit 109. This inserting cam acting region is a feature that corresponds to the "first engaging region" of the invention. Further, the spherical surface of the steel ball 137 and the boundary portion 139c of the operating sleeve 139 form a releasing cam actuating region for moving the operating sleeve 139 from the movement preventing position to the movement allowing position by engaging and interacting with each other when the steel balls 137 move outward. This releasing cam actuating region is a feature that corresponds to the "third engaging region" of the invention.

In this manner, the driver bit 109 is allowed to be further inserted into the bit mounting hole 133. The driver bit 109 is then flintier inserted until the lock groove 109b of the driver bit 109 faces the steel balls 137. When the lock groove 109b reaches this position, as shown in FIG. 5, the operating sleeve 139 moves from the movement allowing position to the movement preventing position by the biasing force of the biasing spring 141. At this time, each of the steel balls 137 is caused to move to the inside position via the releasing cam actuating region and engages with the lock groove 109b and with the movement preventing portion 139a. As a result, the steel ball 137 is held engaged with-the lock groove 109b. Therefore, the driver bit 109 is held such that it cannot be pulled out of the anvil 115 unless the operating sleeve 139 is operated. Specifically, in the state of engagement with the lock groove 109b, the steel ball 137 engages with a boundary portion 109d between the shank 109a and the lock groove 109b of the driver bit 109 when an external force acts on the driver bit 109 in the direction of removing the driver bit 109. In this manner, the steel ball 137 serves as a stopper for preventing removal of the driver bit 109. Thus, the spherical surface of the steel ball 137 and the boundary portion 109d between the shank 109a and the lock groove 109b form a removal preventing cam acting region for preventing removal of the driver bit 109 by engaging with each other during removal of the driver bit 109. This removal preventing cam actuating region is a feature that corresponds to the second engaging region of the invention.

In this embodiment, the through hole 135 is an elongate hole of which length in the axial direction of the anvil 115 is longer than the diameter of the steel ball 137. Therefore, when an external force acts on the driver bit 109 in the diction of removing the driver bit 109 in the state shown in FIG. 5, as shown in FIG. 6, the steel ball 137 moves forward and the center of the steel ball 137 is located generally right above the middle of the movement preventing portion 139a As a result the engagement of the steel ball 137 with the lock groove 109b can be maintained more reliably. However, the through hole 135 may be a circular hole having about the same diameter as the steel ball 137, only if the operating sleeve 139 is not acted or not easily acted upon by components of fore in the direction of moving the operating sleeve 139 forward via the steel ball 137 when an external force acts on the driver bit 109 in the direction of removing the driver bit 109 in the state shown in FIG. 5 and pushes the steel ball 137 forward via the removal preventing cam actuating region. Further, in this embodiment, the tip end side periphery 109c of the driver bit 109, the boundary portion 109d between the shank 109a and the lock groove 109b, and the boundary portion 139c between the movement preventing portion 139a and the movement allowing space 139b of the operating sleeve 139, which form the cam actuating regions at the respective engaging regions, each have an curvilinearly or linearly inclined surface as shown in the drawings, so that the steel ball 137 can move smoothly. However, instead of the inclined surface each of them may have a vertical surface which is perpendicular to the axial d on of the driver bit 109.

As mentioned above, according to this embodiment, the driver bit 109 can be easily mounted in the tool holder 131 simply by inserting the driver bit 109 into the bit mounting hole 133 of the anvil 115. Further, in this mounted state, the driver bit 109 can be reliably prevented from being removed. Then, in order to remove the driver bit 109 from the tool holder 131, as shown in FIG. 7 the operating sleeve 139 is manually moved forward by the user from the movement preventing position to the movement allowing position against the biasing force of the biasing spring 141. By this operation, the movement preventing portion 139a is disengaged from the steel ball 137, so that the steel ball 137 is freed from the movement prevention of the movement preventing portion 139a. At this time, the steel ball 137 faces the movement allowing space 139b of the operating sleeve 139 and is allowed to move to the outside position. In this state, the driver bit 109 can be easily removed.

As mentioned above, when the driver bit 109 is inserted into the bit mounting hole 133, the tip end side periphery 109c of the driver bit 109 pushes the steel balls 137. Then, the operating sleeve 139 is caused to move from the movement preventing position to the movement allowing position via the steel balls 137 against the biasing force of the biasing spring 141. Thus, the driver bit 109 is allowed to be further inserted. When the driver bit 109 is further inserted until the lock groove 109b of the driver bit 109 faces the steel balls 137, the operating sleeve 139 is returned from the movement allowing position to the movement preventing position by the biasing force of the biasing spring 141. As a result, the steel balls 137 are engaged with the lock groove 109b and held in the engaged state. With such construction, according to this embodiment provision of a ring spring can be eliminated which was needed in the prior art tool holder in order to move the steel balls in the anal direction into a position in which the steel balls face the movement preventing portion of the operating sleeve. Thus, it is made possible to decrease the number of pants and simplify the structure while maintaining the ease of operation for mounting and removing the driver bit 109.

Second Representative Embodiment

Figure 8:
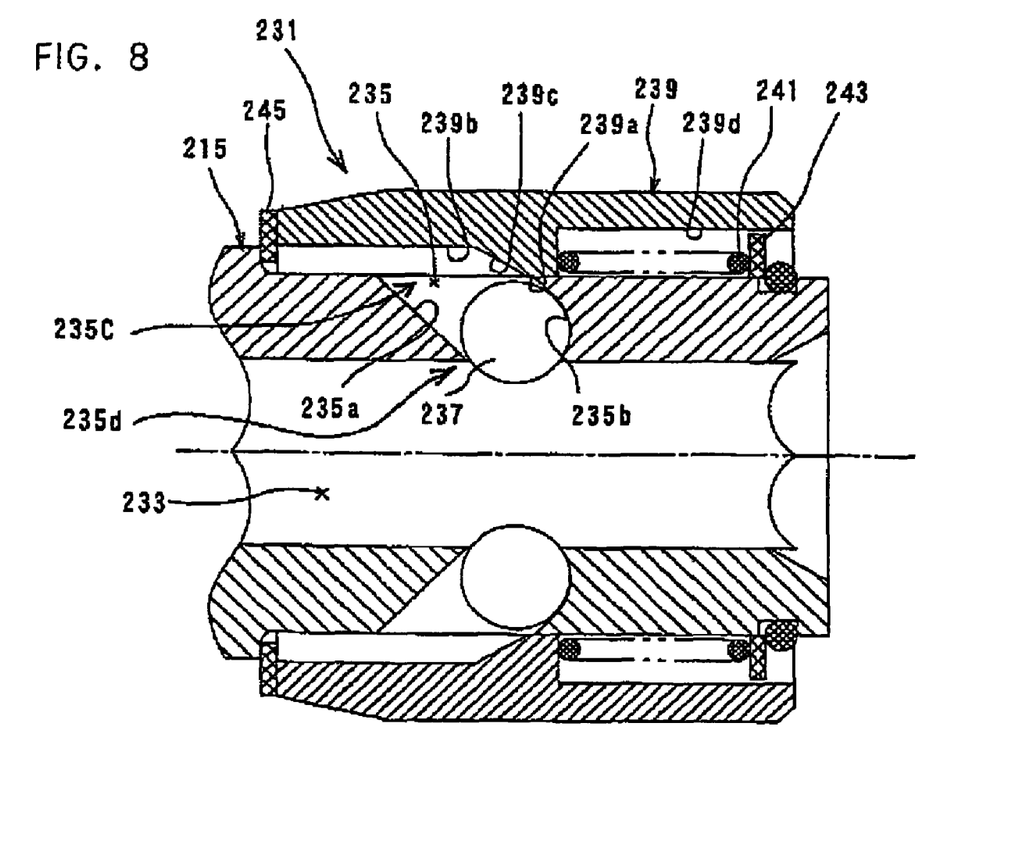
FIG. 8 is a sectional view showing a tool holder according to a second embodiment of the invention.

A tool holder 231 according to a representative second embodiment of the invention will now be described with reference to FIGS. 8 to 12. FIG. 8 shows the tool holder 231 according to the second embodiment. FIGS. 9 to 12 illustrate how a driver bit 209 is mounted in the tool holder 231. As shown in FIG. 8, the tool holder 231 according to the second embodiment has the same construction as the tool holder 131 of the first embodiment except that a through hole 235 is inclined. Therefore, components substantially identical to those in the tool holder 131 of the first embodiment are given numerals between 200 and 300 having the same last two digits as in the first embodiment and their construction will not be described.

The through hole 235 extends linearly at a predetermined inclination angle with respect to the axis of the driver bit 209 such that one opening to the bit mounting hole 235d is located forward of the other opening to the outside surface 235c when viewed from the direction of insertion of the driver bit 209. The opening to the outside surface 235c is corresponding to the "outside opening" and the opening to the bit mounting hole 235d is corresponding to the "bit mounting side opening" of the invention, respectively. In the state in which the driver bit 209 is not mounted in the tool holder 231, each of the steel balls 237 engages with the movement preventing portion 239a or the boundary portion 239c between the movement preventing portion 239a and the movement allowing space 239b of the operating sleeve 239. Thus, the steel ball 237 is held in the position in which the steel ball 237 is protruded from the opening into the bit mounting hole 233.

Figure 9:
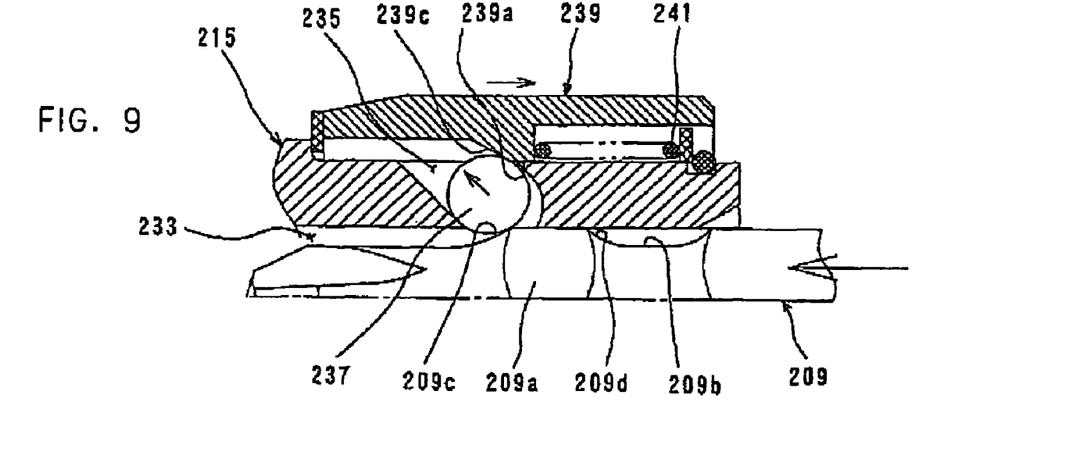
FIG. 9 illustrates how a driver bit is mounted in the tool holder, showing the initial stage of bit insertion.
Figure 10:
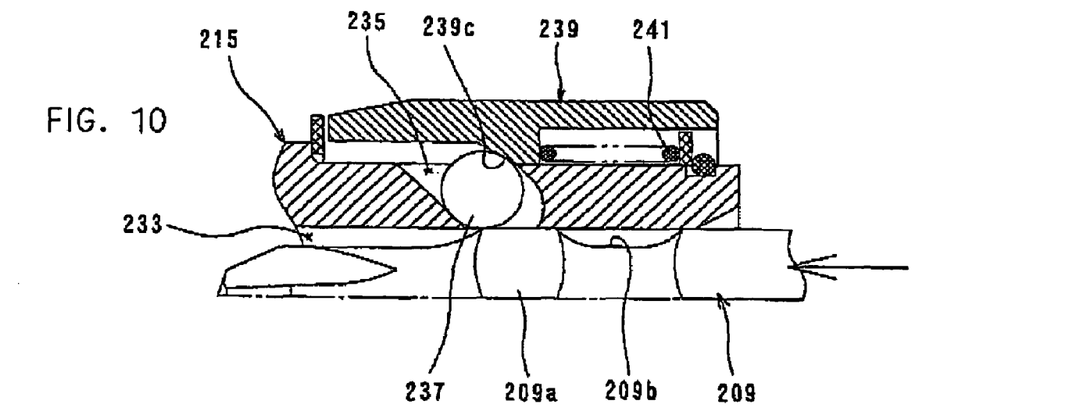
FIG. 10 illustrates how the driver bit is mounted in the tool holder, showing movement of steel balls and an operating sleeve.

In this state, when the driver bit 209 is inserted into the bit mounting hole 233 of the anvil 215 in order to mount the driver bit 209 within the tool holder 231, as shown in FIG. 9, the tip end side periphery 209c contiguous to the shank 209a of the driver bit 209 engages with the steel ball 237. When the driver bit 209 is pushed in this state, the steel ball 237 is moved r along the inclination of the through hole 235, or from the inside position to the outside position in the radial direction. At the same time, the steel ball 237 presses the boundary portion (inclined surface) 239c between the movement preventing portion 239a and the movement allowing space 239b of the op sleeve 239. This pressing force acts upon the operating sleeve 239 as components of force for moving the operating sleeve 239 forward in the anal direction. As a result, as shown in FIG. 10, the movement preventing portion 239a is disengaged from the steel ball 237 against the biasing force of the biasing spring 241, so that the Operating sleeve 239 is caused to move to the movement allowing position.

Specifically, the steel balls 237 move the operating sleeve 239 from the movement preventing position to the movement allowing position while moving radially outward when pressed by the tip end side periphery 209c of the driver bit 209. Thus, each of the steel balls 237 serves as a cam member for allowing further insertion of the driver bit 209. The spherical surface of the steel ball 237 and the tip end side periphery 209c of the driver bit 209 form an inserting cam actuating region for moving the steel balls 237 outward by engaging and interacting with each other when the driver bit 209 is inserted. This inserting cam actuating region is a feature that corresponds to the "first engaging region" of the invention Further, the spherical surface of the steel ball 237 and the boundary portion 239c of the operating sleeve 239 form a releasing cam actuating region for moving the operating sleeve 239 from the movement preventing position to the movement allowing position by engaging and interacting with each other when the steel ball 237 moves outward. This releasing cam actuating region is a feature that corresponds to the "third engaging region" according to the invention.

Figure 11:
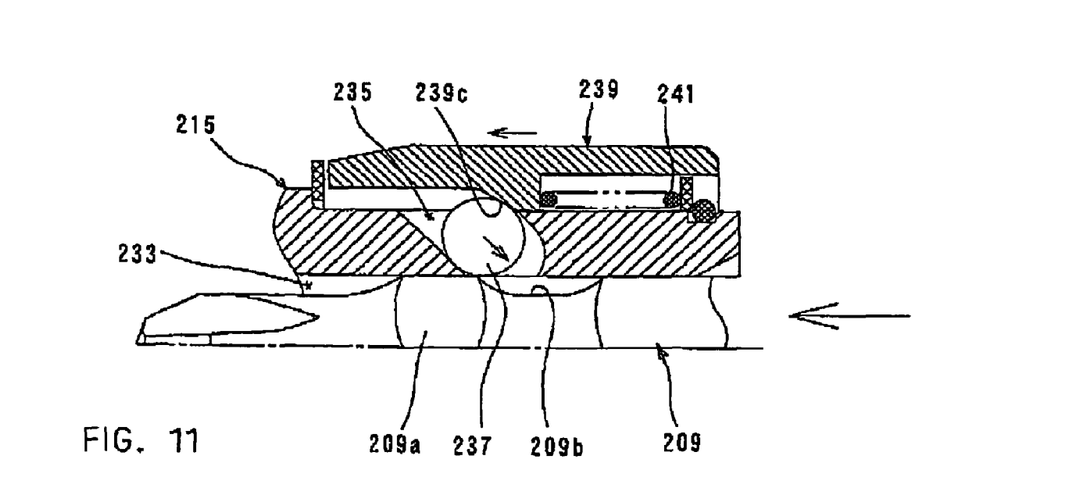
FIG. 11 illustrates bow the driver bit is mounted in the tool holder, showing movement of the steel balls and the operating sleeve.
Figure 12:
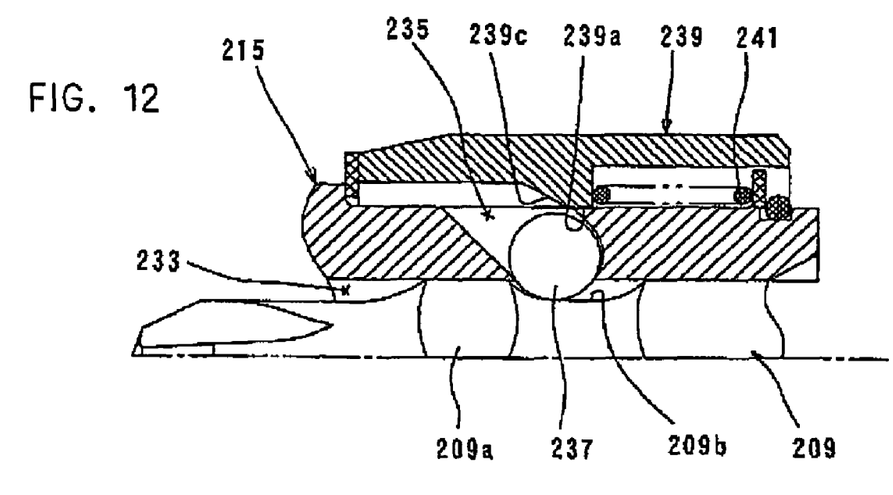
FIG. 12 illustrates how the driver bit is mounted in the tool holder, showing the state in which the driver bit is locked and prevented from being removed by an engagement of the steel balls with the lock groove of the driver bit.

In this manner, the driver bit 209 is allowed to be further inserted into the bit mounting hole 233. Therefore, as shown in FIG. 11, the driver bit 209 is further inserted until the lock groove 209b of the driver bit 209 faces the steel ball 237. When the lock groove 209b reaches this position, as shown in FIG. 12, the operating sleeve 239 moves from the movement allowing position to the movement preventing position by the biasing force of the biasing spring 241. At this time, each of the steel balls 237 is caused to move to the inside position via the releasing cam actuating region and engages with the lock groove 209b. As a result, the steel ball 237 is held engaged with the lock groove 209b. Therefore, the driver bit 209 is held irremovable from the anvil 215 unless the operating sleeve 239 is operated. Specifically, in the state of engagement with the lock groove 209b, the steel ball 237 engages with the boundary portion 209d between the shank 209a and the lock groove 209b of the driver bit 209 when an external force acts on the driver bit 209 in the direction of removing the driver bit 209. 1 this manner, the steel ball 237 serves as a stopper for preventing removal of the driver bit 209. Thus, the spherical surface of the steel ball 237 and the boundary portion 209d between the shank 209a and the lock groove 209b form a removal preventing cam actuating region for preventing removal of the driver bit 209 by engaging with each other when the driver bit 209 is removed This removal preventing cam actuating region is a feature that corresponds to the "second engaging region" in this invention.

According to this embodiment, the through hole 235 is an inclined hole. Therefore, when the driver bit 209 is inserted into the bit mourning hole 233, the steel ball 237 is pushed by the driver bit 209 and smoothly slides along a rearward inclined surface 235a of the inclined hole when viewed from the bit inserting direction. Thus, the operation of inserting the driver bit 209 into the bit mounting hole 233 can be easily performed When an external force acts on the driver bit 209 in the direction of removing the driver bit 209 with the steel ban 237 held in engagement with the lock groove 209b of the driver bit 209 the steel ball 237 tends to move from the inside position to the outside position At this time, while the steel ball 237 is pressed toward the movement preventing portion 239a in order to prevent the removal of the driver bit 209, a forward inclined surface 235b of the inclined hole (when viewed from the tool bit inserting direction) applies resistance to this movement of the steel ball 237. As a result, the force of the steel ball 237 to presses the movement preventing portion 239a of the operating sleeve 239 outward (in the radial direction) can be alleviated. As a result, durability of the operating sleeve 239 can be enhanced.

In order to remove the driver bit 209 from the tool holder 231, the operating sleeve 239 is manually moved by the user from the movement preventing position to the movement allowing position against the biasing force of the biasing spring 241. By this operation, the movement preventing portion 239a is disengaged from the steel balls 237 so that the steel balls 237 are released from the movement prevention of the movement preventing portion 239a. At this time, the steel balls 237 face the movement allowing space 239b of the operating sleeve 239 and are allowed to move to the outside position. In this state, the driver bit 209 can be easily removed. According to the second embodiment, like in the first embodiment, provision of a Ting spring can be eliminated which was needed in the prior art tool holder in order to move the steel balls in the axial direction into a position in which the steel balls face the movement preventing portion of the operating sleeve. Thus, it is made possible to decrease the number of parts and simplify the strobe while maintaining the ease of operation for mounting and removing the driver bit 209.

Modification of the Second Embodiment

Figure 13A:
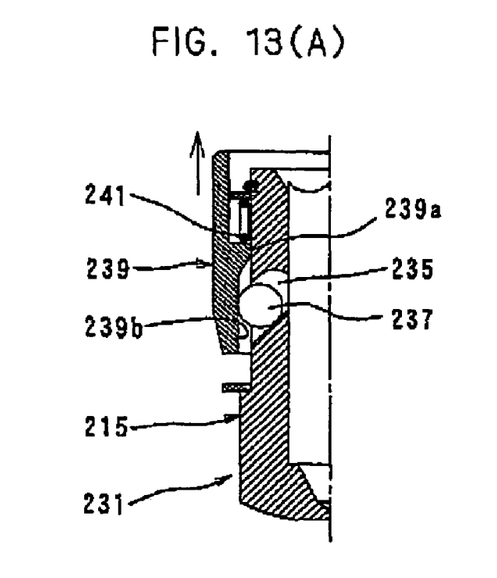
Figure 13B:
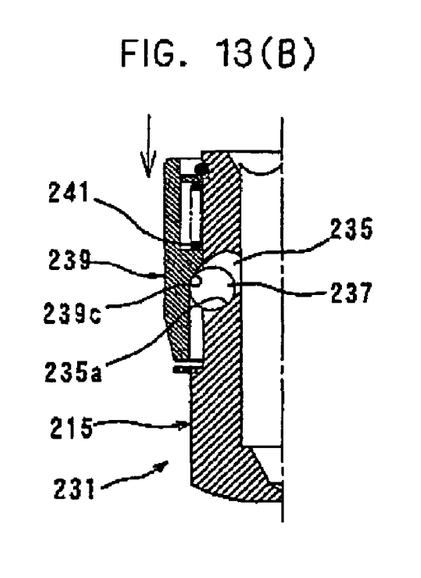

In the case of the tool holder 231 according to the second embodiment, as shown in FIG. 13(A), when the operating sleeve 239 is moved by the user, with the tool holder 231 in an upright position, from the movement preventing position to the movement allowing position again the biasing force of the biasing spring 241, the steel ball 237 is disengaged from the movement, preventing portion 239a and may move into the movement allowing space 239b of the operating sleeve 239 along the inclined surface of the through hole 235 under its own weight In this state, when the operating sleeve 239 is released, the operating sleeve 239 moves back toward the initial movement preventing position. In this step, as shown in FIG. 13(B), the steel ball 237 engages in between the inclined surface of the boundary potion 239c of the operating sleeve 239 and the rearward inclined surface 235a of the through hole 235. As a result, the operating sleeve 239 may be locked or rendered unmovable both to the movement preventing position and to the movement allowing position.

Figure 14:
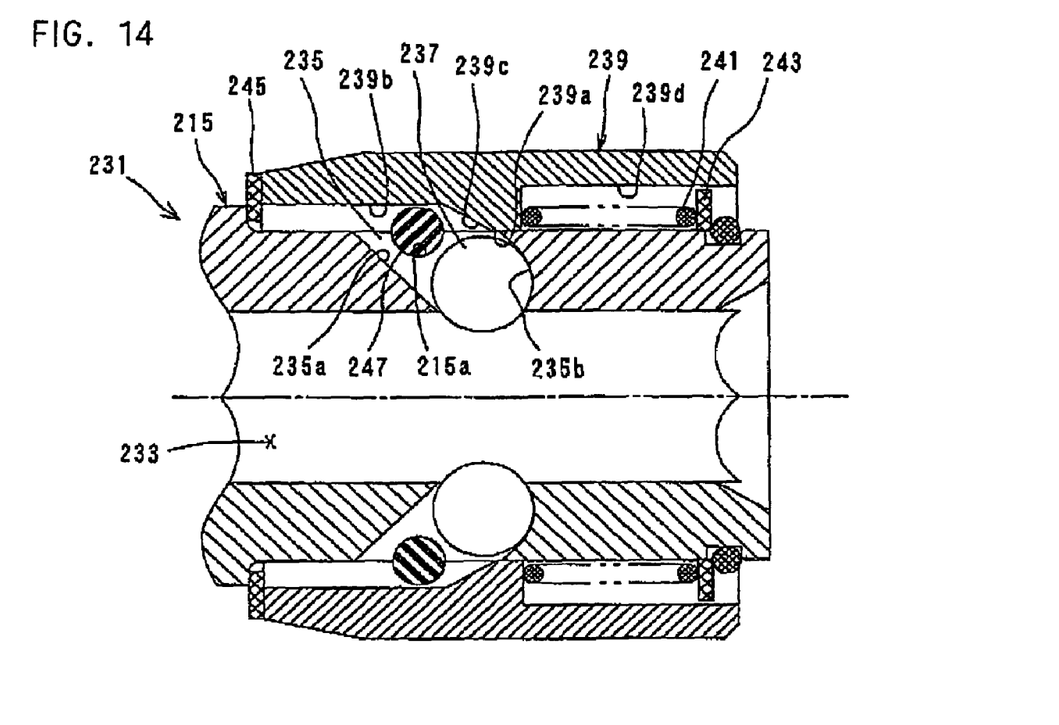
FIG. 14 is a sectional view showing a tool holder according to a modification to the second embodiment.

Therefore, m order to eliminate such problem, a modification to the second embodiment is provided. As shown in FIG. 14, in the tool holder 231 according to this modification, a ring-like elastic member 247 is provided to eliminate the above-mentioned locking problem. The elastic member 247 is disposed across a region of the outside opening of e though hole 235 and prevents free movement of the steel ball 237. The elastic member 247 is a feature that corresponds to the "stopping member" in tie present invention. The elastic member 247 is fitted in an annular groove 215a that is formed around the anvil 215 in a region including the outside opening of the through hole 235. The elastic member 247 and the groove 215a are positioned and dimensioned so as to provide a predetermined clearance from the steel ball 37 in the state in which the driver bit 209 is not mounted in the tool holder 231.

Figure 19A:
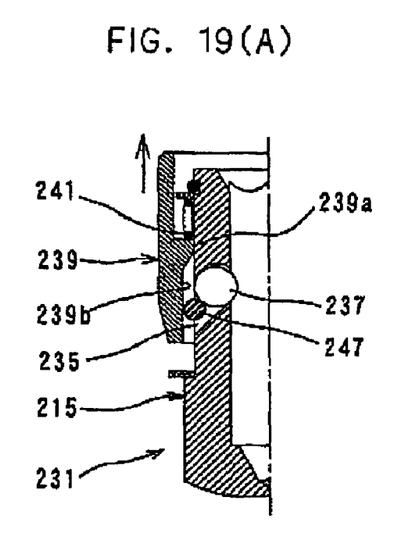
Figure 19B:
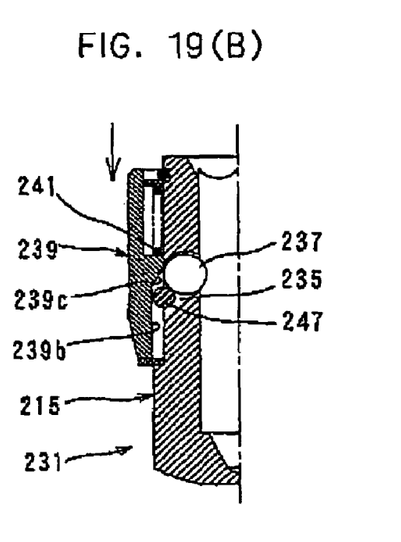

By thus constructing, as shown in FIG. 19(A), even if the operating sleeve 239 is moved by the user, with the tool holder 231 in an upright position, from the movement preventing position to the movement allowing position against the biasing force of the biasing spring 241, the elastic member 247 can prevent the steel ball 237 from moving into the movement allowing space 239b of the operating sleeve 239. Therefore, when the operating sleeve 239 is released, as shown in FIG. 19(B), the operating sleeve 239 can return to the initial movement preventing position by the biasing force of the biasing spring 241. Thus, the operating sleeve 239 can be prevented from locking.

Figure 15:
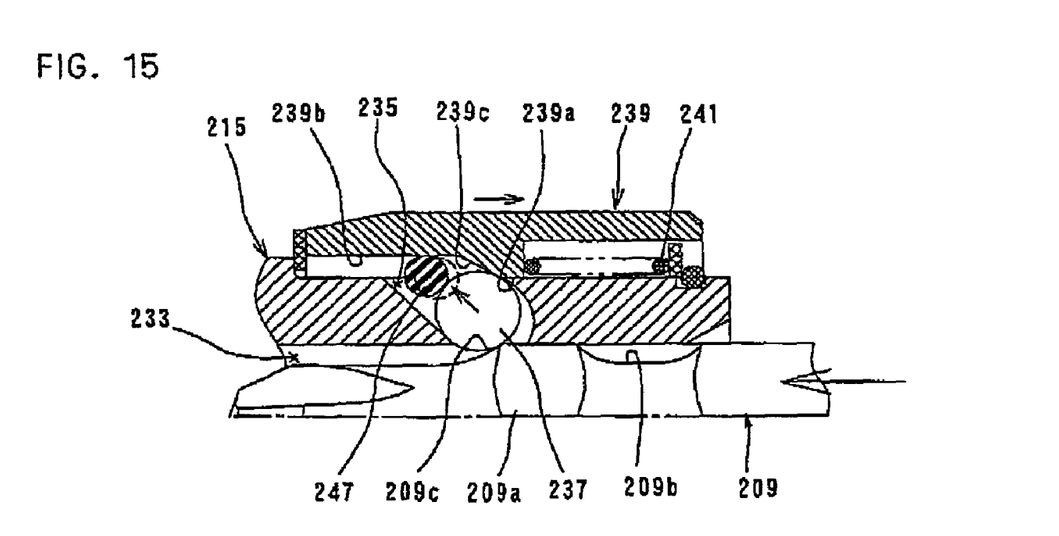
FIG. 15 illustrates how the driver bit is mounted in the tool holder, showing the initial stage of bit insertion.
Figure 16:
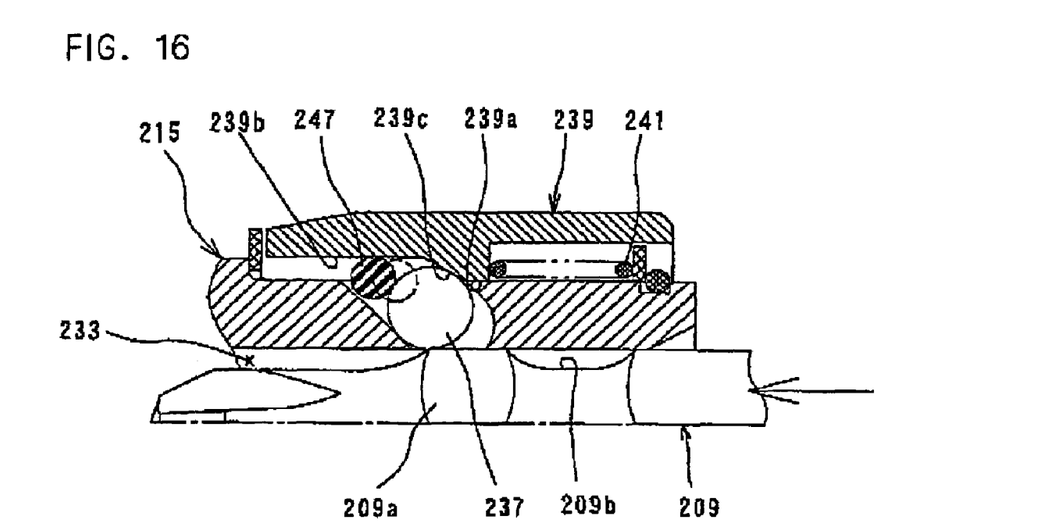
FIG. 16 illustrates how the driver bit is mounted in the tool holder, showing movement of the steel balls and the operating sleeve.
Figure 17:
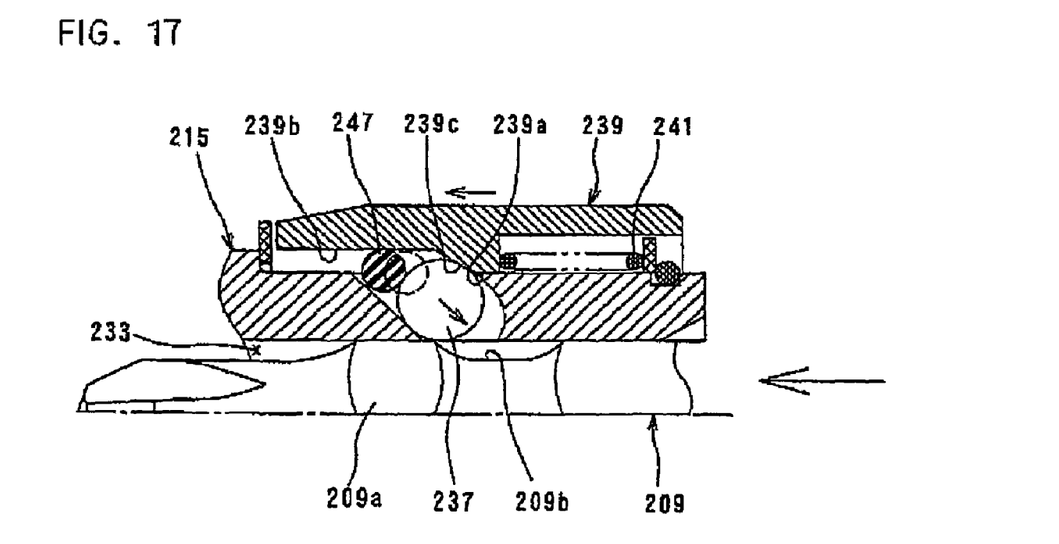
FIG. 17 illustrates how the driver bit is mounted in the tool holder, showing movement of the steel balls and the operating sleeve.
Figure 18:
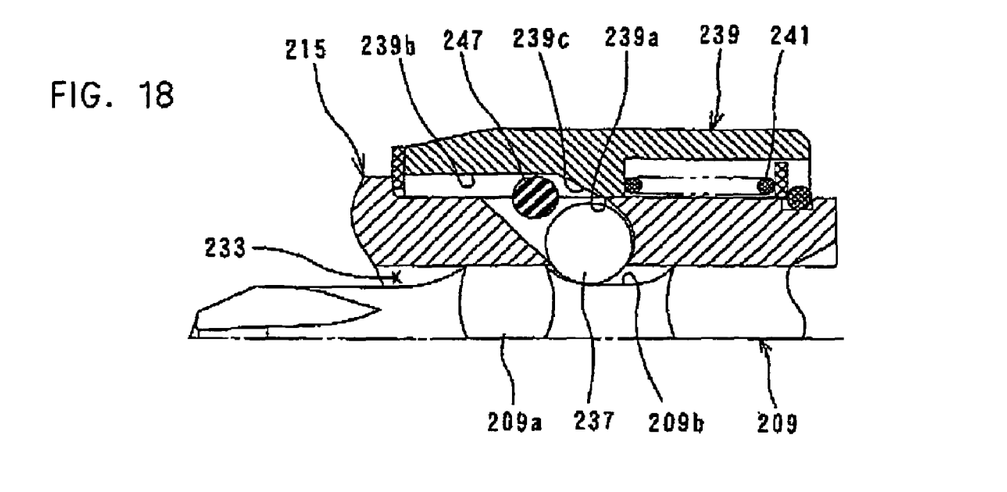
FIG. 18 illustrates how the driver bit is mounted in the tool holder, showing the state in which the driver bit is locked, or prevented from being removed, by engagement of the steel balls with the lock groove of the driver bit.

When the driver bit 209 is inserted into the bit mounting hole 233 in order to mount the driver bit 209 within the tool holder 231, the driver bit 209 pushes the steel ball 237 toward the outside position. At this time, as shown in FIGS. 15 to 17, the elastic member 247 is pushed by the steel ball 237 and elastically deformed in part. Such deformation allows movement of the steel ball 237 and thus further insertion of the driver bit 209. When the driver bit 209 is further inserted until the lock groove 209b of the driver bit 209 faces the steel ball 237, the steel ball 237 engages with the lock groove 209b. At the same time, as shown in FIG. 18, the elastic member 247 elastically returns to its original position. Thus, according to this embodiment the operating sleeve 239 can be prevented from locking when the operating sleeve 239 is operated with the tool holder 231 held in an upright position. Further, the driver bit 209 can be mounted within the anvil 215 without a hitch.

Although, in the above embodiments, the impact driver 100 for use in screw-tightening operation has been described as an example of the power tool, this invention can also be widely applied to rotary tools, such as a screwdriver, an impact wrench and a drill or impact tools, such as a hammer and a hammer drill for use in chipping or drilling operation.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly steed that all value ranges or indications of groups of entities disclose every possible intermediate value or intermediate entity for the purpose of original disclosure as well as for the purpose of restricting the claimed invention, in particular as limits of value ranges.

DESCRIPTION OF NUMERALS

100 impact driver (power tool)
101 body
103 motor housing
105 gear housing
107 handgrip
109 driver bit (tool bit)
109a shank
109b lock groove
109c tip end side periphery
109d boundary portion
111 speed reducing mechanism
112 spindle
113 ball
114 hammer
115 anvil (bit holding member)
116 compression coil spring
121 driving motor
122 motor shaft
123 power switch
125 trigger
131 tool holder
133 bit mounting hole
135 through hole
137 steel ball (engaging member)
139 operating sleeve (operating member)
139a movement preventing portion (movement preventing portion)
139b movement allowing space
139c boundary portion
139d space
141 biasing spring (biasing member)
143 spring receiving ring
145 stopper
209 driver bit (tool bit)
209a shank
209b lock groove
209c tip end side periphery
209d boundary position
231 tool holder
215 anvil
215a annular groove
233 bit mounting hole
235 through bole
235a rearward inclined surface
235b forward inclined surface
237 steel ball
239 operating sleeve (operating member)
239a movement preventing portion (movement preventing portion)
239b movement allowing space
239c boundary portion
239d space
241 biasing spring (biasing member)
243 spring receiving ring
245 stopper
247 elastic member (stopping member)

What we claim is

1. A power tool for driving a tool bit that performs a predetermined operation on a workpiece, the tool bit defining a first cam member and a second cam member, the power tool comprising:
    a tool holder that holds the tool bit;
    a cylindrical bit holding member provided with the tool holder, the cylindrical bit holding member defining a bit mounting hole and a through hole, wherein the tool bit can be inserted into or removed from the bit mounting hole in an axial direction of the tool bit,
    the through hole having an outside opening defined by one end of the through hole that is open to an outside surface of the cylindrical bit holding member, and having a bit mounting hole side opening defined by an other end of the through hole that is open to the bit mounting hole;
    an engaging member disposed within the through hole to move between an outside position in which the engaging member protrudes from the outside opening and an inside position in which the engaging member protrudes from the bit mounting hole side opening, wherein the engaging member can move in an axial direction of the bit holding member and a radial direction of the bit holding member,
    a cylindrical operating member coupled on the bit holding member that can move in the axial direction of the tool bit holding member,
    a movement preventing portion disposed within the cylindrical operating member, the cylindrical operating member moving between a first position and a second position relative to the cylindrical bit holding member, wherein the movement preventing portion prevents movement of the engaging member from the inside position to the outside position by engaging with the engaging member when located in the first position and wherein the movement preventing portion allows movement of the engaging member between the inside position and the outside position by disengaging from the engaging member when located in the second position, a biasing member that applies a biasing force to the operating member so as to hold the movement preventing portion normally in the first position, a first engaging region defined between the tool bit and the engaging member, wherein the first engaging region is formed in a direction of insertion of the tool bit into the bit mounting hole, a third engaging region defined between the tool bit and the engaging member, wherein the third engaging region is formed in a direction of removal of the tool bit from the bit mounting hole, the direction of the third engaging region being substantially opposite to the direction of the first engaging region;

a second engaging region defined between the engaging member and the operating member, wherein the second engaging region is formed contiguous to the movement preventing portion when the tool bit is inserted into the bit mounting hole, wherein when the tool bit is inserted into the bit mounting hole, the engaging member moves from the inside portion to the outside portion via the first engaging region and in relation to the movement to the outside position, the engaging member moves the movement preventing portion of the operating member, from the first position to the second position via the second engaging region against the biasing force of the biasing member so as to define a cam actuating member to allow the further insertion of the tool bit, the operating member moving towards the opening of the bit mounting hole, and wherein when the tool bit is inserted into a predetermined position within the bit mounting hole, the movement preventing portion of the operating member moves from the second position to the first position by the biasing force of the biasing spring to cause the engaging member to move from the outside position to the inside position via the third engaging portion such that the engaging member engages with the tool bit via the second engaging region in the inside position so as to define a stopper to prevent removal of the tool bit by further engaging with the movement preventing portion located in the first position.

2. The power tool as defined in claim 1, wherein the engaging member is defined by a ball.

3. The power tool as defined in claim 1, wherein the first cam member guides the engaging member to move from the inside portion to the outside position by maintaining an engagement with the engaging member when the tool bit is inserted into the bit mounting hole.

4. The power tool as defined in claim 1, wherein the second cam member presses the engaging member from the inside position to the outside position by maintaining an engagement between the engaging member and the tool bit within the second engaging region, thereby preventing removal of the tool bit by pressing the engaging member with the movement preventing portion located in the first position.

5. The power tool as defined in claim 1, wherein the operating member comprises a third cam member that guides the movement preventing portion of the operating member within the third engaging region to move from the first position to the second position by maintaining an engagement between the engaging member and the movement preventing portion in relation to the movement of the engaging member from the inside position to the outside position when the tool bit is inserted into the bit mounting hole.

6. The power tool as defined in claim 1, wherein the through hole to receive the engaging member is formed as an elongated hole elongated in the axial direction of the tool bit so as to allow the engaging member to move in the axial direction, whereby, when the tool bit is inserted into the bit mounting hole and presses the engaging member via the first engaging region, the through hole allows the engaging member to move from the movement preventing portion to the third engaging region, and when the tool bit inserted into a predetermined position within the bit mounting hole is moved in the direction of removal of the tool bit and presses the engaging member via the second engaging region, the through hole allows the engaging member to move towards the movement preventing portion.

7. The power tool as defined in claim 1, wherein the through hole is formed as an inclined hole that extends linearly at a predetermined inclination angle with respect to the axis of the tool bit such that the bit mounting hole side opening of the through hole is located forward of the outside opening when viewed from the tool bit inserting direction, and a forward inclined surface of the inclined hole applies resistance to movement of the engaging member which tends to move from the inside position to the outside position when an external force acts on the tool bit in the direction of removal with the engaging member held in engagement with the tool bit via the second engaging region.

8. The power tool as defined in claim 7 further comprising an elastically deformable stopping member disposed in a region of the outside opening of the inclined hole, the stopping member preventing free movement of the engaging member, wherein when the tool bit is inserted into the bit mounting hole and moves the engaging member from the inside position to the outside position via the first engaging region, the stopping member is pushed by the engaging member and elastically deformed to allow the engaging member to move from the inside position to the outside position.

9. The power tool as defined in claim 1, wherein the tool bit is provided to perform screw tightening work, wrench work or drill work.

* * * * *